(12) United States Patent
Pappakurichi Santhanam

(10) Patent No.: US 8,112,995 B2
(45) Date of Patent: Feb. 14, 2012

(54) TURBOCHARGER WITH VARIABLE TURBINE GEOMETRY

(75) Inventor: Kasturirangan Pappakurichi Santhanam, Chennai (IN)

(73) Assignee: Turbo Energy Limited, Chennai (IN)

( * ) Notice: Subject to any disclaimer, the term of this patent is extended or adjusted under 35 U.S.C. 154(b) by 319 days.

(21) Appl. No.: 12/305,769

(22) PCT Filed: Jun. 19, 2006

(86) PCT No.: PCT/IB2006/001735
§ 371 (c)(1),
(2), (4) Date: Dec. 19, 2008

(87) PCT Pub. No.: WO2007/148145
PCT Pub. Date: Dec. 27, 2007

(65) Prior Publication Data
US 2010/0166542 A1  Jul. 1, 2010

(51) Int. Cl.
*F02D 23/00* (2006.01)
*F01B 25/02* (2006.01)
(52) U.S. Cl. ............... 60/602; 415/159; 415/160
(58) Field of Classification Search .......... 60/602; 417/407; 415/159–164
See application file for complete search history.

(56) References Cited

U.S. PATENT DOCUMENTS

| | | | |
|---|---|---|---|
| 5,214,920 | A | 6/1993 | Leavesley |
| 5,231,831 | A | 8/1993 | Leavesley |
| 5,441,383 | A | 8/1995 | Dale et al. |
| 5,947,681 | A | 9/1999 | Rochford |
| 6,269,642 | B1 | 8/2001 | Arnold et al. |
| 6,951,450 | B1 | 10/2005 | Figura et al. |
| 6,974,309 | B2 | 12/2005 | Seki |
| 2004/0261413 | A1 | 12/2004 | Nishiyama et al. |
| 2005/0066657 | A1 | 3/2005 | Zollinger et al. |

FOREIGN PATENT DOCUMENTS

| | | |
|---|---|---|
| EP | 0 226 444 | 6/1987 |
| WO | 03/074850 | 9/2003 |
| WO | 2004/022924 | 3/2004 |
| WO | 2004/022926 | 3/2004 |
| WO | 2005/040560 | 5/2005 |
| WO | 2006/018187 | 2/2006 |

*Primary Examiner* — Mary A Davis
(74) *Attorney, Agent, or Firm* — Hamre, Schumann, Mueller & Larson, P.C.

(57) ABSTRACT

A turbocharger with variable turbine geometry comprising of a turbine housing having an exhaust gas inlet and an outlet, a volute connected to the inlet, and a nozzle wall adjacent the volute, carrying a turbine wheel and is attached to a shaft with a plurality of improved aerodynamic profiled stator blades that are disposed within the turbine housing between the exhaust gas inlet and turbine wheel.

3 Claims, 4 Drawing Sheets

TURBOCHARGER WITH VARIABLE TURBINE GEOMETRY

FIELD OF INVENTION

The present invention belongs to the field of automobile technology and relates to a mechanical invention consisting of a turbocharger that utilizes variable turbine geometry for maximizing the flow efficiency and improving the performance of turbocharger at higher torque demand condition and reduce the particulate emissions. More particularly the invention relates to a turbocharger in which a turbine housing (111) having an exhaust gas inlet and an outlet, a volute connected to the inlet, and a nozzle wall adjacent the volute, carries a turbine wheel (110) and is attached to a shaft. A plurality of improved stator blades, also termed vanes (101), are disposed within the turbine housing (111) between the exhaust gas inlet and turbine wheel. The aerodynamic profiled stator blades operate to provide an operational force that improves the efficiency of the turbocharger.

BACKGROUND OF INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus rotary action of the turbine also causes the air compressor to spin within a compressor housing of the turbocharger that is separate from the exhaust housing. The spinning action of the air compressor causes intake air to enter the compressor housing and be pressurized or boosted to a desired amount before it is mixed with fuel and combusted within the engine combustion chamber.

Turbines generally comprise a turbine wheel mounted in a turbine chamber, an inlet passage extending radially inwards towards the turbine chamber, an inlet chamber arranged around the radially outer end of the inlet passage, and an outlet passage extending axially from the turbine chamber. The passages and chamber communicate such that pressurized gas admitted to the inlet chamber flows through the inlet passage to the outlet passage via the turbine chamber, thereby driving the turbine wheel. In the case of a turbocharger for an internal combustion engine, the turbine wheel drives a shaft, which in turn drives a rotary compressor.

There are currently various known turbocharger designs, relating mainly to various arrangements of the vanes in the turbine. In the turbochargers that are hitherto available in the market, it is often desirable to control the flow of motive gas to the turbine to improve its efficiency or operational range. In order to accomplish this, the nozzle passages leading to the turbine wheel may be of variable geometry. These variable geometry nozzle passages can be provided by means of a plurality of vanes, which are pivotable so as to alter the configuration of the passages there between. The design of the suspension system used in association with the pivoting vane design is critical to prevent binding of either the suspension system or the vanes.

Variable geometry nozzle inlets are thus employed in turbochargers to increase performance and aerodynamic efficiency. The variable geometry systems may be of the rotating vane type described in U.S. Pat. No. 5,947,681 in which a plurality of individual vanes are placed in the turbine inlet nozzle and their rotation sets the nozzle area and thus the flow volume.

Alternatively the variable geometry may be of the piston or sliding vane type described in U.S. Pat. No. 5,214,920 and U.S. Pat. No. 5,231,831 and U.S. Pat. No. 5,441,383. In these systems vanes are mounted on a cylindrical piston, or to an opposing nozzle wall, and the piston moves concentric with turbine wheel axis of rotation so that the vanes progressively close the gap between the piston and the wall and reduce the area of the nozzle inlet. Variable geometry devices are advantageous in that they are potentially fully modulating, being infinitely adjustable throughout their operating ranges. Full flow passes through the turbine at all times (except during engine braking) and so the engine backpressure is greatly reduced.

An example of such a VGT a disclosed in U.S. Pat. No. 6,269,642, as one comprising a moveable unison ring disposed within a turbocharger housing of the turbocharger, and a plurality of vanes rotatable disposed within the housing and coupled to the unison ring. The plurality of vanes is interposed within the turbine housing between an exhaust gas inlet and a turbine wheel. The unison ring is operated to rotate the vanes in unison from a closed position (restricting passage of exhaust gas to the turbine wheel) to an open position (enabling passage of exhaust gas to the turbine wheel) for purpose of controlling the turbocharger to perform in a manner that helps to optimize airflow to the engine.

Patent No. WO/2004/022924 discloses a turbine housing having an inlet passage for receiving exhaust gas from an exhaust manifold of an internal combustion engine, the turbine housing also having an exhaust outlet, a turbine wheel carried within the turbine housing, the turbine wheel being connected to a shaft extending from the turbine housing through a shaft bore via a bearing, to a compressor impeller; a piston, arranged concentric to the turbine wheel and movable parallel to the shaft of the turbine wheel; a plurality of vanes extending substantially parallel to the shaft from a first end of the piston across the inlet passage variably to restrict the flow of exhaust gas to the turbine wheel; a resilient bias urging the piston towards a position in which the vanes provide maximum restriction to receive exhaust gas in the inlet passage. The resilient bias comprises a spring located within the turbine housing. The spring preload and spring rate are selected to set the passage width, ie the nozzle throat between the turbine housing and the turbine wheel, to the optimum for the prevailing conditions, such as engine flow.

Patent No. EP0226444 discloses a turbocharger system with a suspension for the pivoting vane actuation mechanism of a variable nozzle mechanism for a turbocharger includes rotatable guide vanes mounted on a vane ring within an annular nozzle passageway immediately upstream of the turbine wheel. A unison ring is mounted to rotate to cause pivoting of the vanes, on a mounting, which maintains concentricity between the vane ring and the unison ring. In a preferred arrangement, the vane ring is aligned with the turbocharger housing via dowels extending between the two. These dowels also serve to carry rollers thereon. The rollers provide a surface on which the periphery of the unison ring rides. The invention tends to eliminate binding of the variable nozzle system, and maintains the unison ring and vane ring concentrically aligned during operation. The vane ring is continuously aligned with the turbine sidewall to provide an annular passage with a constant width.

Patent No. WO/2004/022926 discloses a turbocharger which the variable nozzle device of the turbocharger comprises an annular arrangement of vanes between a vane ring and an outer ring, wherein the outer ring is integrally formed with a peripheral ring fitted on the vane ring and fixedly mounted to the center housing. The vanes are pivotally supported on the vane ring and the peripheral ring against an annular disc member supported on the center housing axially urges the vane ring.

Patent No. WO/2005/040560 discloses a turbocharger that includes a vane assembly for guiding flow from the chamber into the turbine wheel, the vane assembly comprising vanes that include at least dividing vanes, the dividing vanes corresponding in number to the number of dividing walls, each dividing vane forming an extension of one of the dividing walls and extending generally radially inwardly from the dividing wall and terminating at a trailing edge of the dividing vane, the dividing vanes thereby extending the sector-division of the turbine housing to the trailing edges of the dividing vanes; and a variable-geometry mechanism comprising a tubular piston disposed radially inward of the chamber, the piston being axially slidable relative to the chamber between a relatively open position and a relatively closed position in which a fractional portion of the axial length of the sectors is blocked by the piston so as to limit flow into the turbine wheel, wherein the piston and the dividing vanes overlap radially, the dividing vanes are mounted on one of the piston and a fixed structure of the turbine, and the dividing vanes are received in axially extending slots of the other of the piston and the fixed structure when the piston is in the closed position.

Patent No. WO/2003/074850 discloses a vane for use in a variable geometry turbocharger, the vane comprising: an inner airfoil surface; an outer airfoil surface oriented opposite the inner airfoil surface, the inner and outer airfoil surfaces defining a vane airfoil thickness; a leading edge positioned along a first inner and outer airfoil surface junction; and a trailing edge positioned along a second inner and outer airfoil surface junction; wherein the vane has an airfoil thickness that is greater than about 0.16 times a length of the vane as measured between the vane leading and trailing edges; and wherein the inner airfoil surface comprises a convex surface portion and a concave surface portion moving from the vane leading edge to the vane trailing edge.

To achieve exhaust gas flow control in such variable nozzle turbochargers multiple pivoting vanes that are positioned annularly around the turbine inlet are used. The pivoting vanes are commonly controlled to alter the throat area of the passages between the vanes, thereby functioning to control the exhaust gas flow into the turbine. In order to ensure the proper and reliable operation of such variable nozzle turbochargers, it is important that the individual vanes be configured and assembled within the turbine housing to move or pivot freely in response to a desired exhaust gas flow control actuation. Vanes used in such known Variable Geometric Turbochargers (VGTs) are not characterized as having an aerodynamic vane, with the vane outer surface and a vane inner surface. Generally speaking a conventional vane has an airfoil thickness that is less than about 0.14, and can be in the range of from about 0.05 to 0.14 the length of the vane (as measured between vane leading and trailing edges). While such conventional slim or thin airfoil vanes are useful for providing peak aerodynamic efficiency in a Variable Geometric Turbocharger (VGT), this particular vane design limits the flow and turbine efficiency throughout the range of motion for the vanes within the turbocharger.

In order to ensure the proper and reliable operation of such Variable Geometric Turbochargers (VGT), it is important that the individual vanes be configured and assembled within the turbine housing to move or pivot freely in response to a desired exhaust gas flow control actuation. Because these pivoting vanes are subjected to millions of high temperature cycles during turbocharger operation it is necessary that any such pivoting mechanism be one that is capable of repeatedly functioning under such cycled temperature conditions without enduring any cycled temperature related material or mechanical problem or failure.

In variable geometry turbochargers of the prior art, attempts have been made to maximize aerodynamic performance, of the vanes, which are subject to extreme temperature variation and mechanical stress. One approach taken to achieve exhaust gas flow control in such Variable Geometric Turbochargers (VGT) involves the use of multiple pivoting vanes that are positioned annularly around the turbine inlet. The pivoting vanes are commonly controlled to alter the throat area of the passages between the vanes, thereby functioning to control the exhaust gas flow into the turbine.

Known multiple vane Variable Geometric Turbochargers (VGT) include vanes that are each configured having a stem projecting outwardly there from, each such stem being positioned within a respective stem opening in a turbine housing or nozzle wall. While the vanes are commonly actuated to pivot vis-à-vis their stem within the respective openings, it has been discovered that such vane attachment and pivoting mechanism is not without its problems.

Firstly, in order to ensure freely pivoting movement of the vane stem with the opening it is essential that the stem project perfectly perpendicularly from the vane, to thereby avoid undesired binding or otherwise impairment of the vane pivoting movement. Secondary straightening or machining operations are sometimes necessary to ensure the perpendicularity of the vane shafts, which secondary operations can be both time consuming and costly.

Secondly, this type of vane attachment and pivoting mechanism can produce a high cantilevered load on the vane stem when actuated that can also impair free vane pivoting movement, and that can ultimately result in a vane material or mechanical failure.

It is, therefore, desirable that a vane pivoting mechanism be constructed, for use with a variable nozzle turbocharger, in a manner that provides improved vane operational reliability when compared to conventional vane pivoting mechanisms. It is also desired that an improved vane configuration be constructed that provides a throat area that is similar or better than that of the conventional slim airfoil vane configuration, while at the same time provide a throat area turndown ratio that is improved, and an improved turbine efficiency throughout the range of vane movement, when compared to the conventional slim airfoil vane configuration.

There exists a need for a turbocharger capable of overcoming these technical aspects to maximize output pressure and enhance overall performance.

Unlike these conventional Variable Geometric Turbochargers (VGT) turbocharger systems a turbocharger in accordance with this invention has the advantage over the prior art in that it possesses inventive features detailed above and claimed at a later stage.

OBJECTIVES

The objective of the present invention is to provide an arrangement or design for use with a variable nozzle turbocharger that enables improved gas flow distribution even at higher torque when compared to conventional mechanism.

Another objective of the present invention is to minimize or eliminate unwanted airflow effects within the turbocharger associated with air leakage across the vane, thereby providing improved vane operational reliability and turbocharger efficiency.

Another objective of the present invention is to improve the flow and in turn increase the turbine efficiency throughout the range of motion.

Another objective of the present invention is to provide improved transient response.

Yet another objective of this invention is to provide increased braking power.

SUMMARY

In view of the above circumstances, the present invention has an object to provide a turbocharger system that possess an improved flow and in turn increase the turbine efficiency throughout the range of motion.

To achieve the above object, according to the first feature of the present invention, there is provided a turbocharger system comprising: a turbine housing (111) having an inlet passage for receiving exhaust gas from an exhaust manifold of an internal combustion engine, the turbine housing (111) also having an exhaust outlet, a turbine wheel (110) carried within the turbine housing (111), the turbine wheel (110) being connected to a shaft extending from the turbine housing (111) through a shaft bore via a bearing, to a compressor impeller; a piston, arranged concentric to the turbine wheel (110) and movable parallel to the shaft of the turbine wheel (110); a plurality of vanes (101) extending substantially parallel to the shaft are disposed within the turbine housing (111) between the exhaust gas inlet (124) and turbine wheel (110) from a first end of the piston across the inlet passage.

In the preferred mode according to the first feature of the present invention, an annular arrangement of vanes (101) is between a vane carrying ring (106) and an outer ring (120), wherein the outer ring (120) is integrally formed with a peripheral ring (121) fitted on the vane carrying ring (106) and fixedly mounted to the center housing.

In the preferred mode according to the second feature of the present invention, in addition to the arrangement of the first feature, the vanes (101) are pivotally supported on the vane carrying ring (106) and the vane carrying ring (106) is axially urged by the peripheral ring (121) against an annular disc member supported on the center housing.

In the preferred mode according to the third feature of the present invention, in addition to the arrangement of the first feature, a vane (101) leading edge is positioned along a first inner and outer airfoil surface junction. A vane (101) trailing edge is positioned along a second inner and outer airfoil surface junction. This configuration makes it possible to improve flow and in turn increase the turbine efficiency.

In the preferred mode according to the fourth feature of the present invention, in addition to the arrangement of the third feature there is no spacer arrangement to separate vane (101) from vane carrying ring (106) and the spacer disc (113) that butts on turbine housing (111). This configuration makes it possible to minimize or eliminate the undesired passage of gas along the vane surface, thereby operating to increase turbocharger operating efficiency.

In the preferred mode according to the fifth feature of the present invention, in addition to the arrangement of the fourth feature, the integral rollers (108) are made as integral rolling element, simple in design and more importantly eliminates the roller dowel pin found in the conventional arrangement. Further the integral roller (108) is located more conveniently on a circular guiding groove (107) on the vane carrying ring (106). This configuration makes it possible to maintain a compact construction and eliminates number of moving parts during the rolling action with reduced friction.

The above and other objects, features, and advantages of the present invention will become readily apparent from the following detailed description of the preferred embodiments thereof taken in conjunction with the accompanying drawings. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
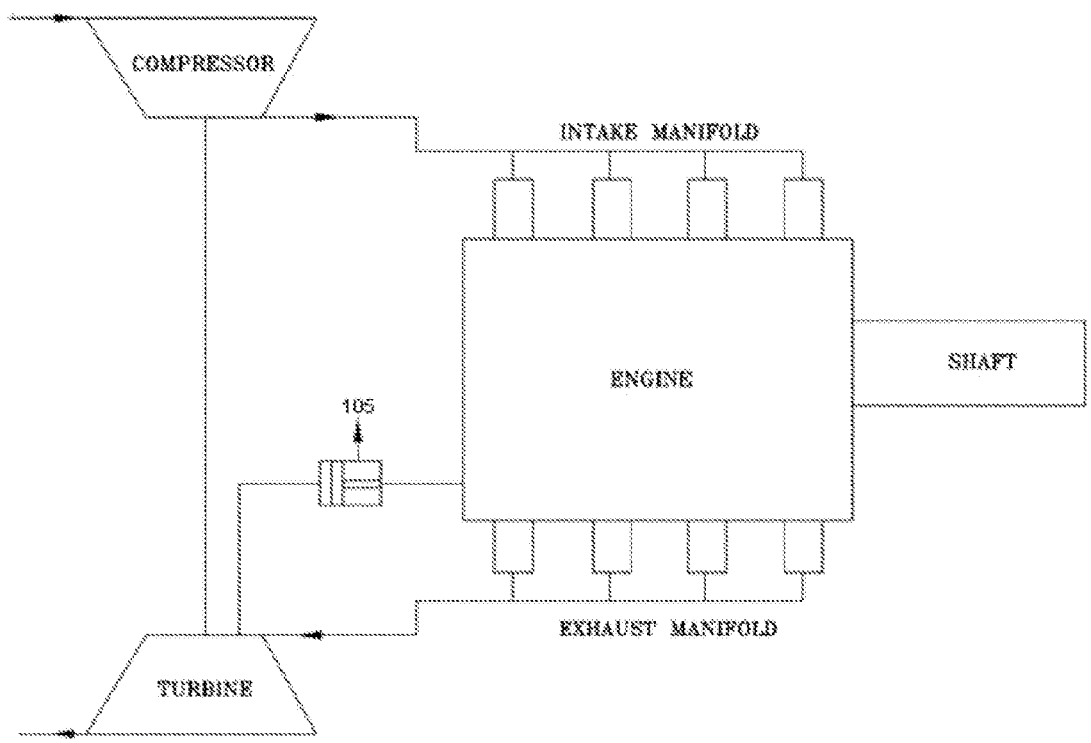
FIG. 1 is an overview of the turbocharger system.

A turbocharger system according to an embodiment of the present invention will now be described hereinafter with reference to FIGS. 1 to 4.

The present invention is described in conjunction with the description and corresponding drawings wherein: The overview of the mechanism is illustrated in conjunction with FIG. 1.

According to the present invention, a turbocharger with variable turbine geometry comprises a turbine housing (111) having an exhaust gas inlet (124) and an outlet (123). A turbine wheel (110) is provided and is attached to a shaft. It is characterized in that pluralities of vanes (101) of aerodynamic profile are supported by a vane carrying ring (106).

In a further embodiment of the invention, a turbocharger assembly with variable turbine geometry is provided in which the vane with a leading edge and a trailing edge. Said vane posses an airfoil of radial thickness (as measured between opposed outer and inner airfoil) from about 0.16 to 0.50 the length of the vane (as measured by a straight line between the vane leading and trailing edges). Further a constant ratio of 1:3 is maintained between the thickness and length of the vanes. Further, the vane leading edge is characterized by having relatively large radius of curvature such that an adjacent portion of the outer airfoil surface is located at a relatively great distance from links, thereby operating to provide an increased thickness to the adjacent the leading edge.

In a further embodiment of the invention, a turbocharger with variable turbine geometry is provided wherein each roller (108) is integral.

In a further embodiment of the invention, a turbocharger with variable turbine geometry is provided wherein there is maximum flow efficiency with improved performance at higher torque demand condition.

Figure 4:
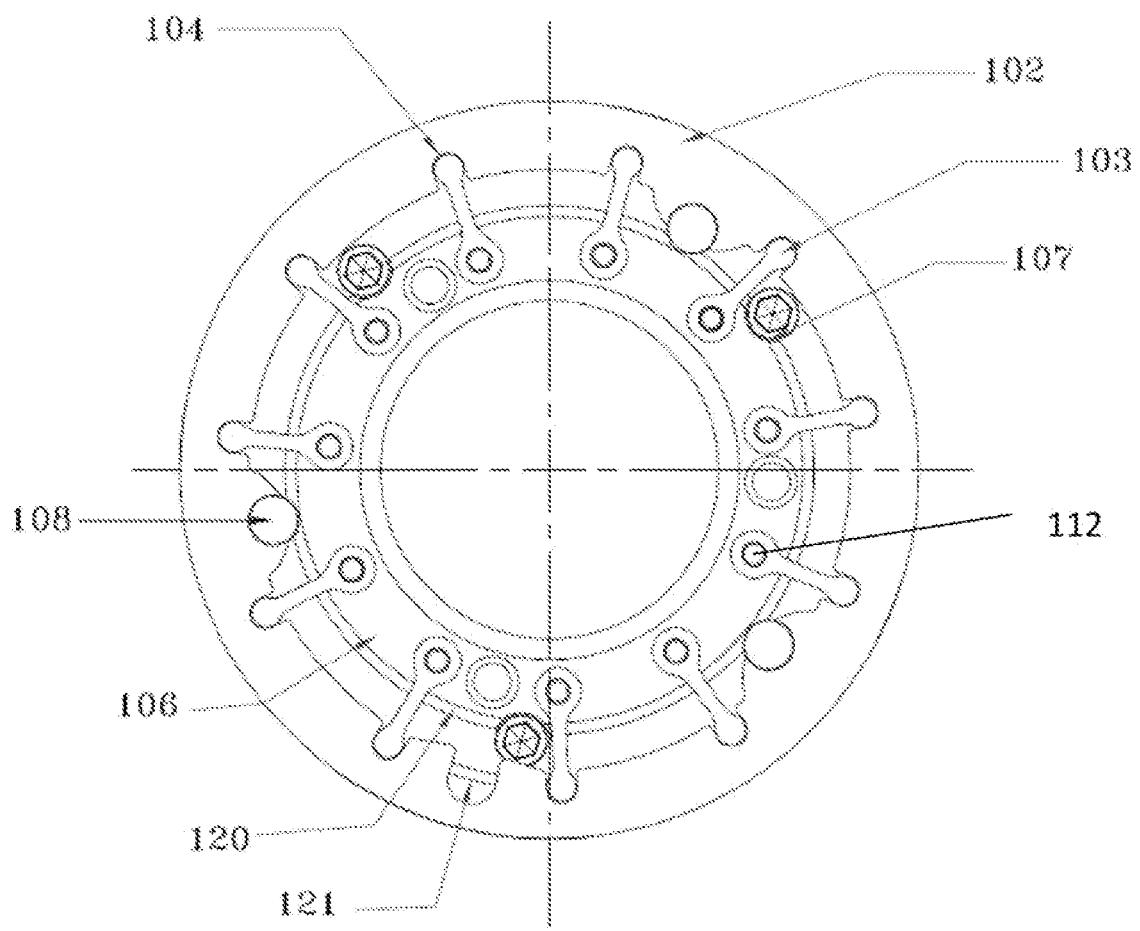
FIG. 4 illustrates a sectional view of the turbocharger mechanism.

In a further embodiment of the invention, a turbocharger with variable turbine geometry is provided wherein on application to automobile engines will result in braking improvement and reduce the particulate emissions The first exemplary embodiment of the turbocharger system shown in FIG. 1 has a center housing having a turbine housing (111) attached at one end, and a compressor housing (109) attached at an opposite end. A shaft is rotatably disposed within a bearing assembly contained within the center housing. A turbine or turbine wheel (110) is attached to one shaft end and is carried within the turbine housing (111), and a compressor impeller is attached to an opposite shaft end and is carried within the compressor housing (109). The turbine housing (111) has a standard inlet (124) for receiving an exhaust gas stream, and an outlet (123) for directing exhaust gas to the exhaust system of the engine. A volute (125) is connected to the exhaust inlet (124) and an outer nozzle wall (126) is incorporated in the turbine housing (111) casting adjacent the volute. The turbine wheel (110) and shaft assembly is carried within the turbine housing (111). Exhaust gas, or other high-energy gas supply in the turbocharger, enters the turbine through the inlet and is distributed through the volute (125) in the turbine housing (111) for substantially radial entry into the turbine wheel through a circumferential nozzle entry. Multiple vanes (101) are mounted to the nozzle wall (126) by shafts (112) that project perpendicularly in between (see FIG. 4). The shafts (112) are disposed within respective openings in the vane carrying ring (106). The vanes (101) are each connected to links (103) (as depicted in FIG. 4) that project from a side opposite the shafts (112) and that are engaged by respective slots (104) in a claw plate.

The variable-geometry mechanism of the present invention described in FIG. 1 includes an actuator assembly (105) connected with automobile engine through a linking mechanism. The actuator used is a piston type actuator and in the preferred mode of embodiment the actuating device is mounted on a perpendicular projection of the turbine housing (111).

Figure 2:
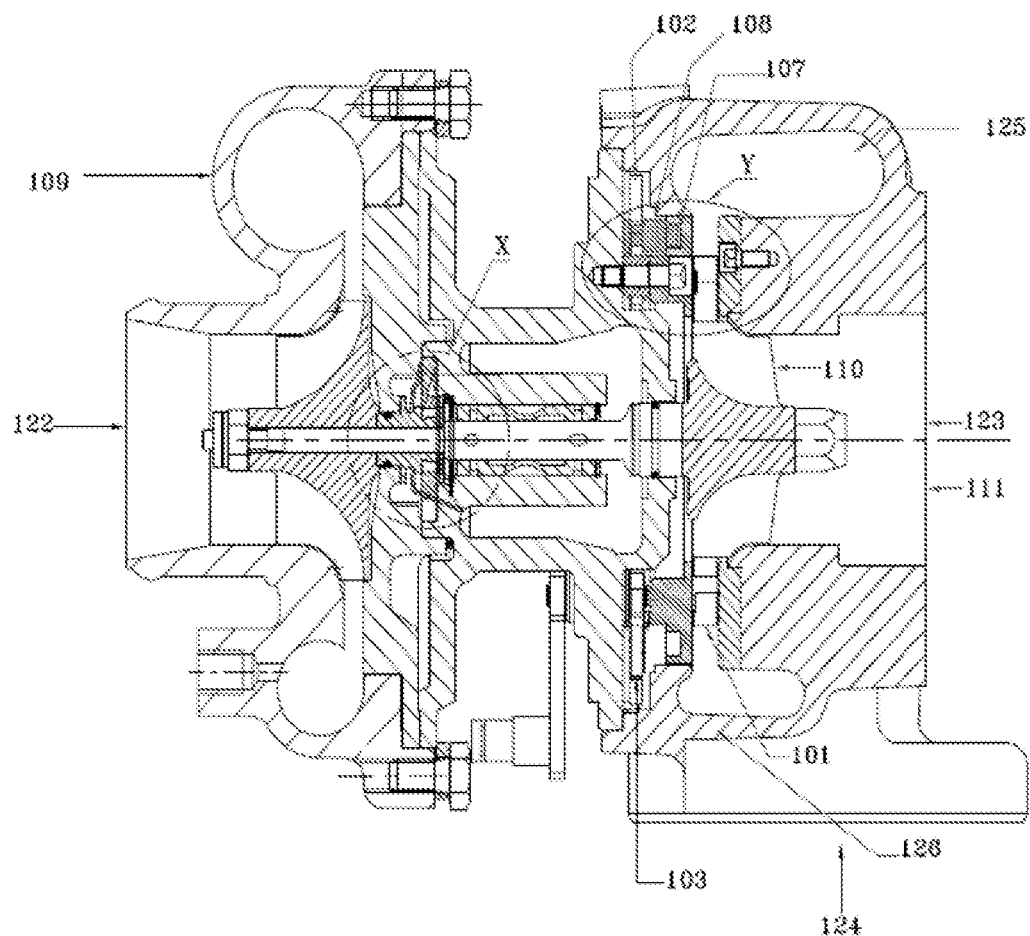
FIG. 2 is a sectional view of the turbocharger illustrating the novel features such as integral roller in accordance with an embodiment of the present invention.
Figure 2A:
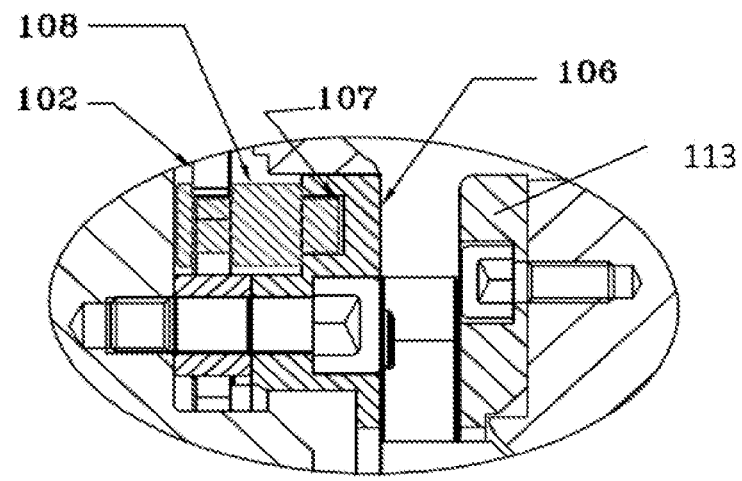
FIG. 2A is a close up view of the portion shown in the circle Y in FIG. 2.

As shown in FIG. 2, the actuator assembly (105) is connected with the claw plate (102) and is configured to rotate the claw plate (102) in one direction or the other as necessary to move the vanes (101) radially, with respect to an axis of rotation of the turbine wheel, outwardly or inwardly to respectively increase or decrease the flow of exhaust gas to the turbine. As the claw plate (102) is rotated, the links (103) are caused to move within their respective slot. Since the slots (104) are oriented with a radial directional component along the claw plate (102), the movement of the links (103) within the respective slots (104) causes the vanes (101) to pivot via rotation of the vane shafts (112) within their respective openings and open or close the nozzle area depending on the claw plate (102) rotational direction.

Figure 3:
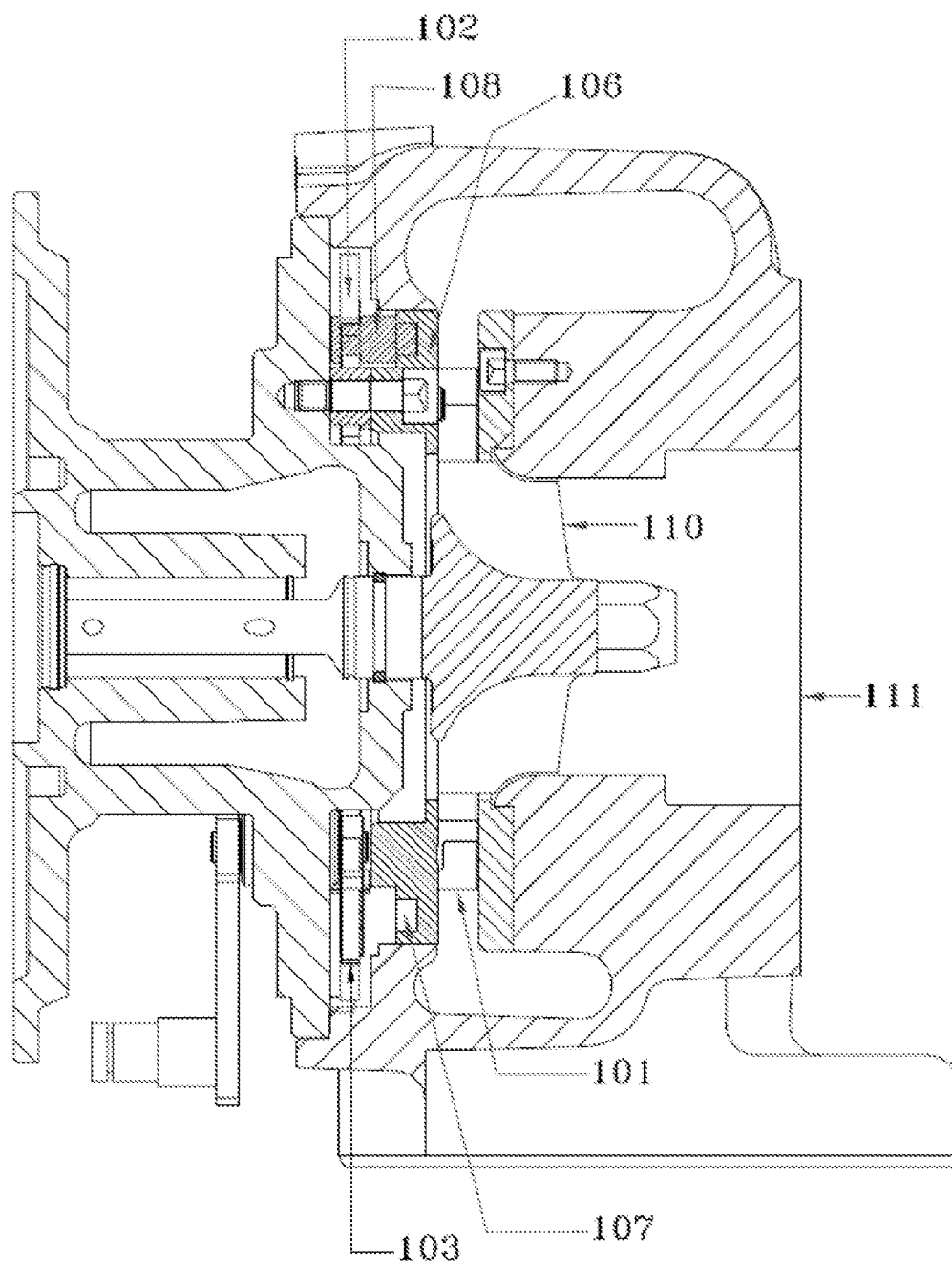
FIG. 3 is a section of the turbocharger constructed according to principles of this invention.

With reference to FIG. 3 the vane (101) has a leading edge and a trailing edge at opposite common ends. Vane (101) posses an airfoil of radial thickness (as measured between opposed outer and inner airfoil) from about 0.16 to 0.50 the length of the vane (101) (as measured by a straight line between the vane leading and trailing edges). Further, the vane leading edge is characterized by having relatively large radius of curvature such that an adjacent portion of the outer airfoil surface is located at a relatively great distance from the links (103), thereby operating to provide an increased thickness to the adjacent the leading edge.

The relatively thin airfoil thickness for the vane (101) is a result of the relatively straight airfoil outer and inner vane surfaces. The vane is characterized as having a continuous outer surface defined by a relatively large radius contrasted with the conventional slim airfoil vane for purposes of minimizing the incidence effects through the flow range of the vane.

In conjunction with FIG. 4, the turbocharger with variable turbine geometry as embodied in the present invention comprises a claw plate (102). Each vane (101) is configured having the core of the vane (101) positioned to correspond with the slot (104) in the claw plate (102).

FIG. 4 illustrates the portion of the vane axial surface that corresponds to the overlay of the claw plate slots (104) that is subject to gas leakage. Axial surface of the vane is configured having the core of the vane positioned to correspond with the claw plate slot (104) to minimize the leak path for gas being passed through the slot.

In different vane operating positions, as the claw plate (102) is rotated, the vane tabs (103) are caused to move within their respective slot. Since the slots (104) are oriented radially along the claw plate (102), the movement of the vane tabs (103) within the respective slots (104) causes the vanes to pivot via rotation of the vane shafts (112) within their respective openings and move radially outwardly or inwardly depending on the claw plate (102) rotational direction.

In a closed position the vanes (101) are operated by the claw plate (by tab in slot cooperation) to position each vane leading edge radially inward toward the turbine wheel (110) to form a circular ring thereby serving to close off and limit the flow of exhaust gas through the vanes and to the turbine. At an intermediate position the claw plate (102) is rotated a sufficient amount to move the vane leading edge radially outwardly, thereby enabling the vanes to increase the flow of exhaust gas to the turbine when compared to closed position At fully open position the claw plate (102) is rotated to a maximum position, causing the vanes to be pivoted-radially outwardly to a maximum position, thereby providing a maximum flow of exhaust gas to the turbine when compared to the intermediate position. In the closed position the exhaust flow passageway between the adjacent vanes is defined by opposed substantially parallel surfaces consisting of the vane outer and inner airfoil surfaces.

The pressure field varies significantly throughout the vane operating range. Detailed investigation of this phenomenon shows that high vane closure forces can be generated when the vanes are in the more closed position, as there is a significant acceleration of the flow and resulting drop in pressure through the vane. By tailoring the convergence of the passage, the rate at which the flow accelerates through the passage can be controlled and further gives one the ability to control the pressure and the net torque on the vane. Controlling the net torque on the vane allows one to minimize the forces in the vanes system resulting in reduced wear, and a smaller actuation system.

Thus the overall structure of the vanes is simplified and flow efficiency is greatly improved. Vanes of this invention can be formed from the same types of materials used to form conventional vanes. Machining or moulding process can form vanes (101). In a preferred embodiment, vanes of this invention are formed by metal injection moulding technique, are cost effective and at the same time minimize or eliminate undesired gas leakage effects within the turbocharger. Thus, vanes of this invention operate to improve vane mobility, reduce frictional wear effects, improve turbocharger operational efficiency, and extend turbocharger operational service life.

While the invention has been described in connection with specific embodiments thereof, it will be understood that it is capable of further modifications and this application is intended to cover any variations, uses, or adaptations of the invention following, in general, the principles of the invention and including such departures from the present disclosure come within known or customary practice within the art to which the invention pertains and may be applied to the essential features herein before set forth.

What is claimed is:

1. A turbocharger with variable turbine geometry comprising:

a turbine housing having an exhaust gas inlet and an outlet, a volute connected to the inlet, and a nozzle wall adjacent the volute, the turbine housing carrying a turbine wheel that is attached to a shaft;

a plurality of vanes of aerodynamic profile provided between a vane ring and a spacer disc mounted on the turbine housing, the vanes are disposed within the turbine housing between the exhaust gas inlet and the turbine wheel the vane ring includes an outer ring and a peripheral ring, and the vanes are pivotally supported by the vane ring;

each vane having a leading edge and a trailing edge, the leading edge being positioned at a first inner and outer airfoil surface junction and the trailing edge being positioned at a second inner and outer airfoil surface junction;

the vanes include vane shafts that are rotatably supported on and extend through the vane ring, and actuation links are fixed to the vane shafts, the actuation links are engaged in respective slots in a rotatable claw plate;

the thickness to length ratio of the vanes is in the range of 0.16-0.50;

there is no spacer arrangement to separate the vanes from the vane ring;

a plurality of rollers integrally made with a dowel pin and connected to the claw plate; and the vane ring includes a circular slot that receives the plurality of rollers.

2. A turbocharger with variable turbine geometry according to claim 1, wherein the claw plate causes rotation of the vanes to move the vanes radially and thereby change the flow of exhaust gas to the turbine wheel.

3. A turbocharger with variable turbine geometry according to claim 1, wherein when the claw plate is rotated, the actuation links are movable within the respective slots provided in the claw plate.

* * * * *